United States Patent [19]

Robinson et al.

[11] 4,276,408

[45] Jun. 30, 1981

[54] METHOD OF PRODUCING A RESIN FOR PRODUCING HEAT STABLE PRODUCTS, THE RESIN AND THE PRODUCTS

[75] Inventors: Joseph G. Robinson, Winchcombe; Sally A. Brain, Tewkesbury, both of England

[73] Assignee: Coal Industry (Patents) Limited, London, England

[21] Appl. No.: 120,395

[22] Filed: Feb. 11, 1980

[30] Foreign Application Priority Data

Mar. 2, 1979 [GB] United Kingdom ............... 07384/79

[51] Int. Cl.$^3$ ....................... C08G 10/02; C08G 16/02
[52] U.S. Cl. ................................... 528/247; 525/398; 528/129
[58] Field of Search ................. 525/398; 528/129, 247

[56] References Cited

U.S. PATENT DOCUMENTS

| | | | |
|---|---|---|---|
| 2,954,360 | 9/1960 | Krzikalla et al. | 528/247 X |
| 3,303,167 | 2/1967 | Kakiuchi et al. | 525/398 X |
| 3,394,203 | 7/1968 | Winegartner et al. | 525/492 |
| 3,535,185 | 10/1970 | Tveter et al. | 156/335 |
| 3,993,851 | 11/1976 | Robinson et al. | 428/531 |
| 4,038,236 | 7/1977 | Robinson et al. | 528/247 X |

FOREIGN PATENT DOCUMENTS 1057499  2/1967  United Kingdom .
1307635  2/1973  United Kingdom .

*Primary Examiner*—Lucille M. Phynes
*Attorney, Agent, or Firm*—Stevens, Davis, Miller & Mosher

[57] ABSTRACT

This invention relates to a method of producing a phenolated resin which can be used to form heat stable (up to 250°) products.

Previously used resins are either very expensive or do not provide the requisite high temperature properties. An aim of the invention is to provide a cheap equivalent to commercially available high temperature resins.

An aromatic hydrocarbon (e.g. toluene) formaldehyde condensation resin is prepared. The low molecular weight contaminants are removed by a distillation process. The residue contains less than 1% low molecular weight material, and is phenolated to give the final resin. The resin may be cured to give a heat stable product.

The phenolated resin may be used to form glasscloth and asbestos laminates or as a lamp capping cement.

8 Claims, 4 Drawing Figures

METHOD OF PRODUCING A RESIN FOR PRODUCING HEAT STABLE PRODUCTS, THE RESIN AND THE PRODUCTS

This invention relates to a process for the preparation of a phenolated resin from which heat stable products can be made, the resin and products made from the resin. In particular, the invention relates to a process for the preparation of such a resin from cheaply available materials.

Several thermosetting resins have been developed which are stable at high temperatures (in the region from 200° to 250° C.) and which retain their mechanical properties at these temperatures. These resins include polyimides, poly (amide-imides), polybenzimidazoles, and polyphenylenes. These resins are derived expensive materials and are difficult to make. They have limited commercial acceptability either because of their high cost or because their chemical or physical properties are not adequate for their intended use.

There is available a family of resins made by Albright and Wilson, called "Xylok" resins which are relatively cheap compared to the resins mentioned above and which also have acceptable chemical and physical properties. One of these regions, the "Xylok"-210, may be made from phenol (I) and $\alpha,\alpha$-dimethyoxy-p-xylene (II) in a condensation reaction catalysed by stannic chloride. The reaction is shown in the scheme set out at 1 below.

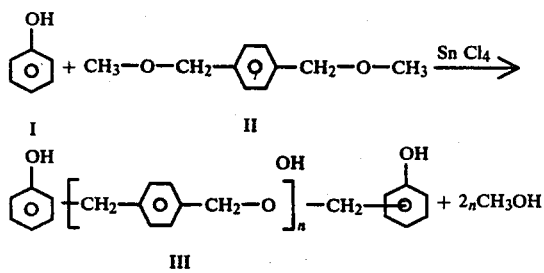

The product of the reaction (III) is a brown solid with a low softening point, which is readily soluble in an aliphatic ketone, for instance methyl ethyl ketone (MEK), to give a varnish. On heating with a formaldehyde donor, such as hexamine, the reaction product (III) is cured to a hard intractable resin which has good thermal stability and retention of physical properties at temperatures up to 250° C.

In British Patent No. 1 462 444 there is disclosed a method of raising the softening part of a toluene-formaldehyde-phenol resin by passing air or steam at 100° C. through the resin at 150° C. for almost three hours. This does not result in any appreciable removal of low molecular weight material and is carried out after the phenolation stage. The phenolated resin is used as a rubber reinforcing resin.

There is a need for a thermosetting resin which is relatively cheap and which has good mechanical and physical properties. The resin would find use as a lamp capping cement, a high temperature insulator, in copper clad high temperature printed circuits, in electric heater panels, in transformers and in glass or asbestos laminates for use as compressor blades.

It is also an object of the present invention to provide a process for preparing an alternative resin having properties similar to those of the "Xylok"-210 resin.

Therefore, according to the present invention there is provided a method for producing a phenolated resin which is curable to give a heat stable product, chatacterised by comprising reacting an alkylated mononuclear aromatic hydrocarbon with formaldehyde to give a condensation resin having an oxygen content from 2 to 18%, wherein the condensation resin is subjected to a distillation process at a temperature up to 200° C. for at least five hours under reduced pressure to produce an intermediate resin containing less than 1% of species having less than three aromatic units per molecule (hereinafter called low molecular weight material), and one part of the intermediate resin is reacted with from 0.7 to 2.0 parts of phenol to produce the phenolated resin.

By heat stable product is meant a product which has good thermal stability and retention of physical properties at temperatures up to 250° C.

It is thought that the distillation process has two effects, although the invention does not depend on such explanation. In the first place it removes from the condensation resin at least a part of the low molecular weight material. Secondly, the distillation causes the higher molecular weight material to polymerise further, the overall effect of the distillation being to increase the average molecular weight of the intermediate resin by a greater amount than would be expected solely by the removal from the condensation resin of all the low molecular weight material.

It is essential to the invention to produce an intermediate resin having less than 1% low molecular weight material, although the reason for this requirement is not fully understood. Nonetheless it has been found that the presence of more than 1% low molecular weight material has an adverse effect on the thermal stability of the phenolated resin after it has been cured.

Preferably the mononuclear alkylated aromatic hydrocarbon is toluene, but other suitable hydrocarbons include xylenes and ethyl benzenes. A readily available starting material which can used to advantage in the present invention is a toluene fraction obtained from coal tar distillation plants, which contains about 70% toluene, the remainder being comprised of ethyl benzenes, xylenes, and other alkyl substituted benzenes. This feedstock is relatively cheap and therefore the product resin can also be made cheaply which is an advantage of the present method.

The formaldehyde may be in the form of formaldehyde itself, formalin (~40% formaldehyde in water) or paraformaldehyde (e.g. paraform '87', a solid polymer of formaldehyde containing about 13% water).

Preferably the aromatic hydrocarbon and formaldehyde are reacted together in the presence of an acid catalyst, advantageously sulphuric acid, to produce the condensation resin. Preferably, the condensation resin has an oxygen content from 8 to 16% and contains a high proportion of methylol substituted aromatic nuclei bridged by methylene or methylene ether groups. Advantageously, to produce such a resin, the molar ratio of formaldehyde to toluene is greater than 1, preferably from 2.5 to 4, and the molar ratio of sulphuric acid to toluene is low, preferably less than 1. A condensation resin made in this way will contain up to 25% low molecular weight material, mainly in the form of ditolyl methane or its ether-bridged analogues.

The distillation is prefeably carried out at a pressure of about 20 mm Hg., at a temperature up to 200° C. The time needed to produce the intermediate resin with less than 1% low molecular weight material will vary with the properties of the condensation resin, but is likely to be at least 6 hours, and preferably the distillation is carried out for about 8 hours. In a commercial plant the balance of time and temperature to produce an economic operation will need to be determined experimentally by those skilled in the art. The intermediate resin preferably has a low molecular weight material content of less than 0.6%.

The intermediate resin is reacted with phenol, conveniently in the presence of an acid catalyst, for example para-toluene sulphonic acid (PTSA). Preferably the phenol used is phenol itself, although other mononuclear aromatic phenols, for example xylenols and cresols, may be used either alone or in mixtures with or without phenol itself. Generally the phenolation reaction is carried out in a solvent, for example toluene, which may be removed after the reaction by distillation.

The process of the present invention may include the step of curing the phenolated resin, for instance by heating it in the presence of formaldehyde, hexamethylene-tetramine (hexamine), or other formaldehyde donor. The phenolated resin may be dissolved in a solvent, for example MEK or industrial methylated spirit (IMS), or mixtures thereof to give a varnish containing from 40 to 60% phenolated resin. The varnish may be used to impregnate a variety of substrates and used to form laminates. Suitable substrates include glasscloths and asbestos fibre mats.

The phenolated resin made by the process of the present invention will find use in any of the fields previously mentioned in this specification. The cured resin has properties which are comparable with those of the "Xylok"-210 resin.

The present invention also includes the phenolated resin made by the process, varnishes incorporating the phenolated resin and the cured resin made from the phenolated resin.

The invention will now be described by way of Example only, with reference to the accompanying drawings in which.

A toluene-formaldehyde condensation resin was made by charging 3.4 kg of water and 18.7 kg of 77% sulphuric acid to a stirred reactor. The temperature of the acid was raised to about 35° C., and 28.2 kg of paraform '87' was added. The reactor was heated to about 60° C. and 25 kg of toluene was added (Molar ratios: formaldehyde to toluene = 3.1; sulphuric acid to toluene = 0.4). The reactor was heated to 90° C. and the toluene/water azeotrope allowed to reflux in a vertical condenser. The temperature of the reaction mixture rose during the reaction to about 102° C. and was held at that temperature for 3 hours. The reactor was then cooled, the aqueous layer separated off and the condensation resin water-washed until neutral. The condensation resin had an oxygen content of 11% and a mean molecular weight of 440.

Figure 2:
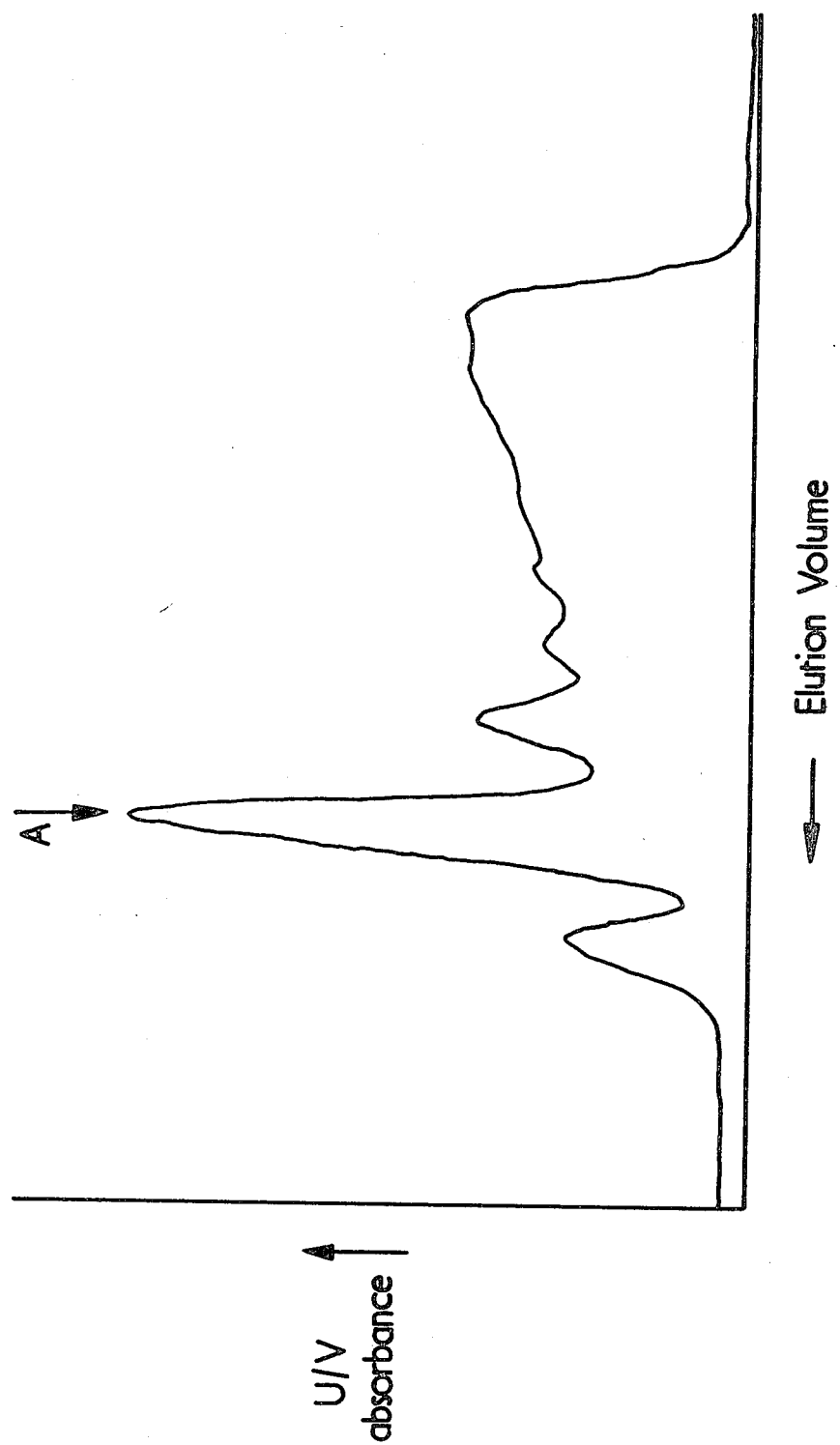
FIG. 2 is a graph showing the molecular weight distribution of a condensation resin made according to the invention.

A sample of the condensation resin was passed through a column of 'Styragel', a molecular seive material, to determine its colecular weight distribution. This distribution is shown in FIG. 2. (A sample applied to a molecular seive material is separated into its component species on a size basis, the larger molecules emerging before the smaller molecules. Thus in the graphs shown in FIGS. 2 and 3 the smaller the elution volume, the larger the molecule).

The peak marked A in FIG. 2 is due to the presence of ditolyl methane, and other analagous low molecular weight species, and represents about 24% of the sample. It can be seen that the majority of the rest of the condensation resin contains species of higher molecular weight than ditolyl methane, which are spread evenly across the molecular weight range shown.

Figure 3:
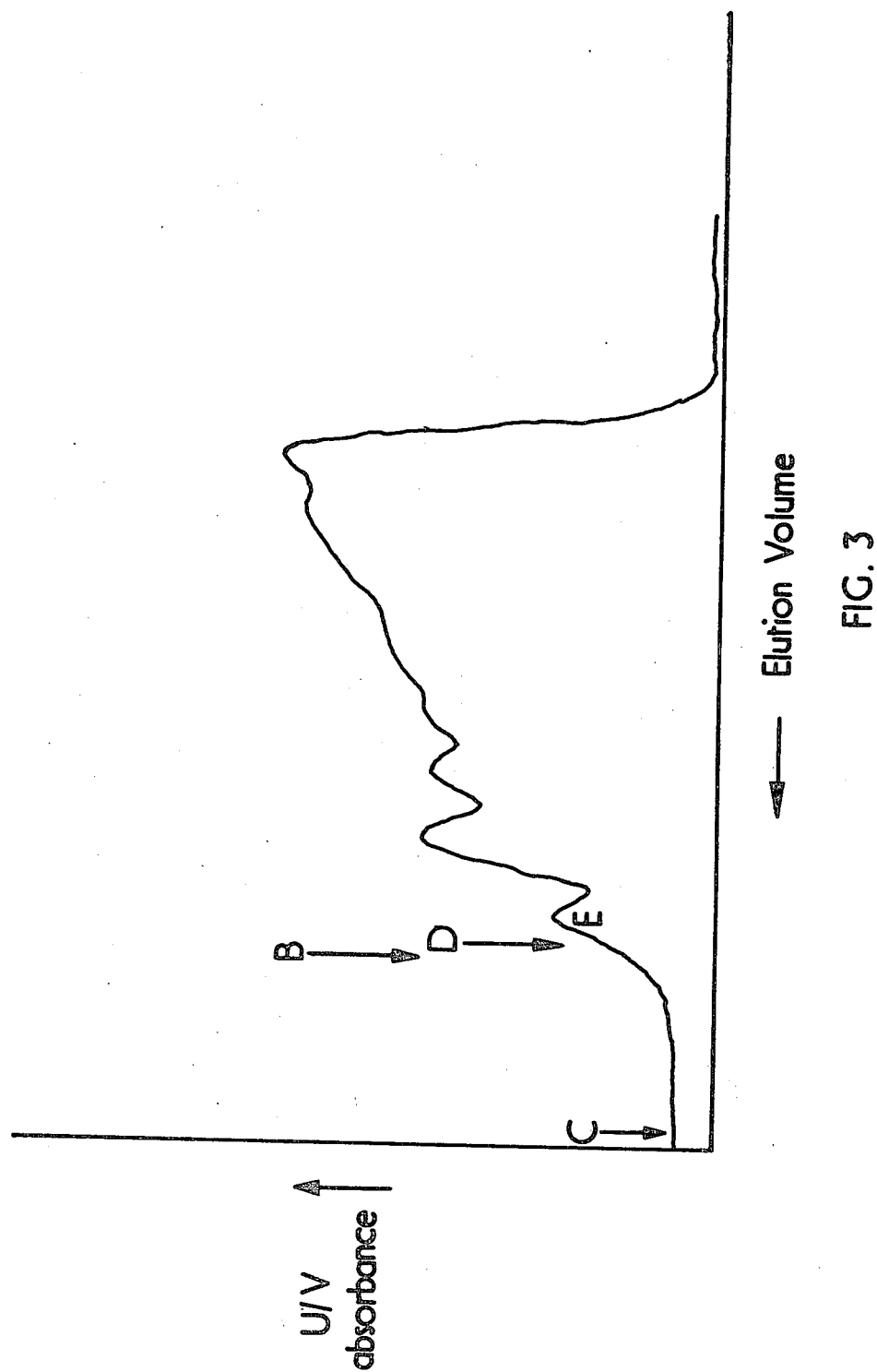
FIG. 3 is a graph showing the molecular weight distribution of an intermediate resin prepared from the condensation resin whose molecular weight distribution is shown in FIG. 2 according to the invention.
Figure 4:
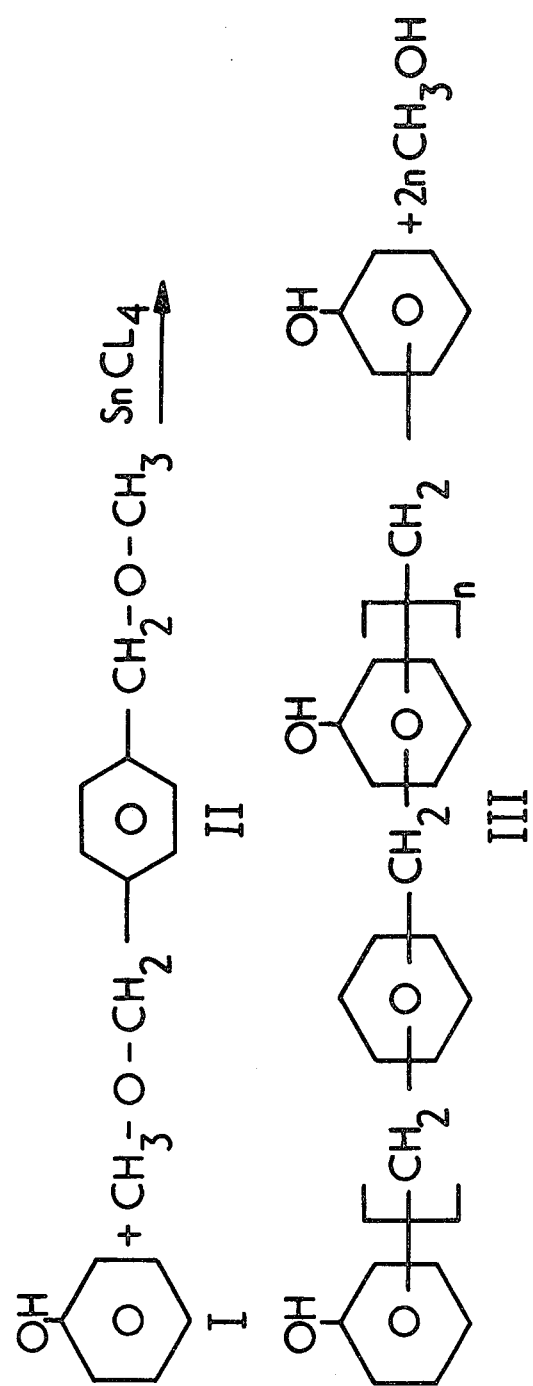
FIG. 4 is a schematic representation of the preparation of "Xylok"-210.

The condensation resin was then subjected to distillation for 8 hours at a pot temperature of 200° C. under a pressure of 20 mm Hg. to produce an intermediate resin as the residue. The molecular weight distribution of a sample of the intermediate resin was determined using the same column as for the condensation resin. This is shown in FIG. 3, from which it can be seen that the peak for ditolyl methane and its analogues, which should appear at the point marked by arrow B, has been nearly completely removed. It is also clear that the molecular weight distribution has been skewed to the higher molecular weight end, thereby indicating that the effect of the distillation is not solely to remove the low molecular weight material, which is eluted between arrows C and D is less than 1% of the total resin. The peak marked E represents the first trinuclear species in the resin.

The intermediate resin was phenolated with phenol itself as follows. 22.5 kg of phenol and 165 g of 100% PTSA were charged to a heated reactor fitted with a reflux condenser. When the reactor temperature reached 85° C., 27.5 kg of the intermediate resin, maintained at about 50° C. to keep the resin flowable, were slowly dripped into the reactor. The resin addition took approximately 1 hour. The temperature of the mixture rose to about 118° C. during the addition. After all the resin had been added, the mixture was heated to about 140° C. and superheated steam at about 150° C. was passed through it to raise the softening point of the phenolated resin. When the softening point of the resin was 105° C. (determined by the Ring and Ball method) the phenolated resin was allowed to cool and was dried. The phenolated resin had the properties given below.

| | |
|---|---|
| Softening point | 105° C. |
| Free Phenol Content | 0.9% |
| Combined Phenol Content | 47.8% |
| Oxygen Content | 8.3% |
| Molecular Weight (Average) | 1050 |
| Low molecular weight material | <1% |

The phenolated resin was then dissolved in sufficient IMS to give a 50% solution, and 0.12 parts of hexamine (based on the weight of the phenolated resin) were added thereto. This provided a varnish which was used to make glasscloth laminates.

Five sheets, each 304 mm. square were cut from a roll of glasscloth using a sharp knife. Each sheet was placed on a glass plate and about 40 g of varnish poured onto it. A hand roller was drawn across the sheet several times to ensure even impregnation of the fabric and to remove excess varnish.

The impregnated sheets were freely suspended and air dried for about 1 hour after which they were pre-cured for a fixed time in an air-circulating oven at 135° C. Each sheet was cut into 4 equal squares and the 20 sheets thus obtained were stacked one on top of each other between plates lined with aluminum foil. The stack of sheets was pressed at 175° C. in a hydraulic press. The initial pressure was 3.4 NM/mm² which was allowed to fall progressively to 1.13 MN/mm² over the 1 hour dwell period. At the end of this time the laminate was cooled to room temperature while still under pressure (1.13 MN/mm²) and thereafter removed for post-curing.

Rectangular test pieces 12.5 mm. wide and of length approximately 27 times their thickness milled from the cured laminates were supported at one end and freely suspended in an air oven at 175° C. and post-cured as follows:

16 hours at 175° C.
4 hours from 175° C. to 200° C.
21 hours at 200° C.
8 hours from 200° to 250° C.

When the post-cure schedule was complete some samples were removed from the oven, the remainder being retained in the oven at 250° C. for different periods to effect heat ageing. Thereafter, the samples were withdrawn and their cross-breaking strengths determined at 250° C. to B.S. 2782, Method 304B, 1970.

Similar sets of glasscloth laminates were prepared using the "Xylok" 210 resin and a commercial high temperature varnish (Bakelite V 19162) and were tested as were the laminates made with resins according to the invention.

Figure 1:
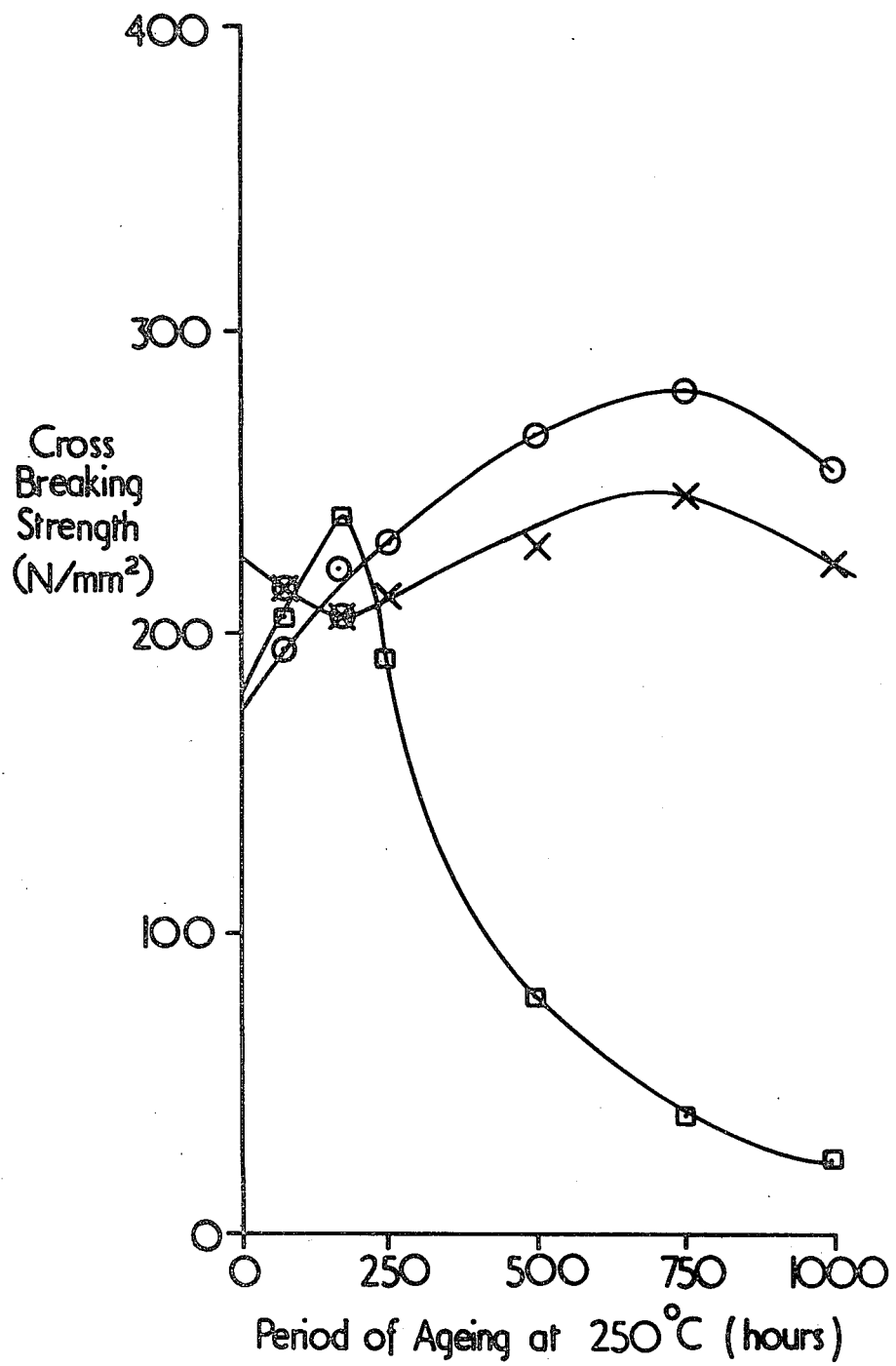
FIG. 1 is a graph showing the mean cross-breaking strengths of various cured resins after ageing for certain periods at 250° C.

The results of these tests are shown in tabular form below and in graphical form in FIG. 1. In FIG. 1 the line marked by crosses (X) represents the mean cross-breaking strengths of laminates made with the resin according to the invention, and the lines with circles (O) and squares (□) represent the "Xylok" 210 and the "Bakelite" laminates' cross-breaking strengths respectively.

TABLE

Cross-Breaking Strengths of Glasscloth

Preparation of Laminate

| Pre-cure (mins) | Resin content of laminate (%) | Resin flow (%) | Cross-Breaking | |
|---|---|---|---|---|
| | | | 0 h | 72 h |
| 7.5 | 33.6 | 6.3 | 121 | 153 |
| 10 | 36 | 0.95 | 64.5 | 143 |
| 10 | 32.6 | 3.8 | 110 | 290 |
| 10 | 32 | 10.3 | 325 | 192 |
| 7.5 | 21 | 28 | 227 | 289 |
| 8.5 | 28 | 15.1 | 239 | 187 |
| 10 | 38.9 | 3.2 | 503 | 189 |
| 12.5 | 34 | 1 | 295 | 186 |

Resin

| | | | | |
|---|---|---|---|---|
| 2 | 24.5 | 4.0 | 349 | 167 |
| 3 | 28 | 3.1 | 337 | 222 |
| 4 | 29.9 | 2.4 | 281 | 184 |
| 4 | 31.4 | 2.6 | 320 | 218 |
| 4 | 34.4 | 1.9 | 281 | 211 |
| 5 | 36.9 | 0.8 | 265 | 213 |
| 5 | 28.5 | 1.4 | 332 | 231 |
| 5 | 32.5 | 1.4 | 302 | 218 |

Laminates made with various resins.

Strength (N/mm²) after different times at 250° C.

TABLE-continued

| 150 h | 250 h | 500 h | 750 h | 1000 h |
|---|---|---|---|---|
| "Xylok" 210 | | | | |
| 179 | 194 | 198 | 280 | 220 |
| 117 | 172 | 215 | 296 | 261 |
| 314 | 323 | 363 | 350 | 319 |
| 260 | 224 | 288 | 195 | 221 |
| Bakelite V 19162 | | | | |
| 229 | 136 | 44 | 26 | 3 |
| 234 | 206 | 61 | 36 | 19 |
| 244 | 186 | 123 | — | 41 |
| 244 | 222 | 86 | 54 | 30 |
| According to the invention | | | | |
| 181 | 246 | 201 | 298 | 256 |
| 256 | 239 | 235 | 341 | 219 |
| 148 | 184 | 224 | 226 | 263 |
| 182 | 212 | 212 | 152 | 150 |
| 164 | 174 | 190 | 229 | 199 |
| 206 | 207 | 203 | 208 | 176 |
| 263 | 207 | 294 | 313 | 292 |
| 230 | 232 | 256 | 260 | 240 |

The mean values of the cross-breaking strength for each resin at each time were taken and plotted against the time at 250° C. to give the graph shown in FIG. 1. As can be seen from this, the "Xylok" 210 resin and the phenolated resin according to the invention produce laminates which have very similar cross-breaking strengths at high temperature much better than do laminates made from the Bakelite resin.

It is therefore clear that the resins made according to the present invention can be used in the same way as can "Xylok" resins, in that the phenolated resin produced according to the method of the present invention can be cured to give heat stable products which retain their properties for long periods at elevated temperatures.

In this specification, all parts and percentages are by weight unless otherwise specified.

We claim:

1. A method of producing a phenolated resin which is curable to give a heat stable product, comprising the steps of;(1) reacting an alkylated mononuclear aromatic hydrocarbon with formaldehyde to give a condensation resin having an oxygen content from 2 to 18%; (2) subjecting the condensation resin to a distillation process at a temperature up to 200° C. for at least five hours under reduced pressure to produce an intermediate resin containing less than 1% low molecular weight material; and (3) reacting one part of the intermediate resin with from 0.7 to 2.0 parts of phenol to produce the phenolted resin.

2. A method according to claim 1, wherein the alkylated mononuclear aromatic hydrocarbon is toluene or a toluene fraction comprising about 70% toluene.

3. A method according to claim 1, in which the condensation resin is produced with an oxygen content from 8 to 16%.

4. A method according to claim 1, in which the distillation process is carried out for about 8 hours.

5. A method according to claim 1, in which the distillation process is carried out to give an intermediate resin having a low molecular weight material content of less than 0.6%.

6. A method of producing a heat stable product comprising the method of claim 1 and including the further step of curing the phenolated resin.

7. A method according to claim 6, in which the curing agent is formaldehyde or a formaldehyde donor.

8. A method of producing a varnish comprising dissolving the phenolated resin made according to the method of claim 1 in a solvent to give a solution containing from 40 to 60% of the phenolated resin.

* * * * *